(12) United States Patent
Mashhoori

(10) Patent No.: US 10,983,249 B2
(45) Date of Patent: Apr. 20, 2021

(54) INDICATOR INTERPOLATION TO PREDICT A WEATHER STATE

(71) Applicant: Farmers Edge Inc., Winnipeg (CA)

(72) Inventor: Ali Mashhoori, Lethbridge (CA)

(73) Assignee: FARMERS EDGE INC., Winnipeg (CA)

(*) Notice: Subject to any disclaimer, the term of this patent is extended or adjusted under 35 U.S.C. 154(b) by 331 days.

(21) Appl. No.: 16/127,851

(22) Filed: Sep. 11, 2018

(65) Prior Publication Data
US 2019/0079214 A1    Mar. 14, 2019

Related U.S. Application Data

(60) Provisional application No. 62/558,643, filed on Sep. 14, 2017.

(51) Int. Cl.
*G01W 1/10* (2006.01)
*G01W 1/00* (2006.01)
(Continued)

(52) U.S. Cl.
CPC ............. *G01W 1/10* (2013.01); *G06F 16/29* (2019.01); *G06F 16/9537* (2019.01); *G01W 2001/006* (2013.01); *G01W 2203/00* (2013.01)

(58) Field of Classification Search
CPC ............. G01W 1/10; G01W 2001/006; G01W 2203/00; G06F 16/29; G06F 16/9537; Y02A 90/10
See application file for complete search history.

(56) References Cited

U.S. PATENT DOCUMENTS 6,549,852 B2   4/2003  Hanson
6,651,005 B2   11/2003 O'Neall
(Continued)

FOREIGN PATENT DOCUMENTS

CA    2663917 C    10/2010
CA    2697608 A1    9/2011
(Continued)

OTHER PUBLICATIONS

European Commission—Joint Research Centre, "Interpolation of observed weather," Apr. 2018, 7 pages [Online] [Retrieved Nov. 28, 2018], Retrieved from the internet: <URL https://marswiki.jrc.ec.europa.eu/agri4castwiki/index.php/Interpolation of observed weather>.
(Continued)

*Primary Examiner* — Manuel L Barbee
(74) *Attorney, Agent, or Firm* — Ryan W. Dupuis; Kyle R. Satterthwaite; Ade Company Inc.

(57) ABSTRACT

A weather prediction model predicts a weather state for a query location within a region. The weather prediction model accesses current and/or historical indicator weather states from weather measurement systems located near the query location. The weather measurement systems that are located near a query location are those within a proximity distance of the query location. The weather prediction model partitions the region into sectors each containing a number of the weather measurement systems. The weather prediction model determines a representative weather state for each sector at a representative distance from the query location using the indicator weather states. The weather prediction model predicts a weather state at the query location by interpolating the representative weather states for the sectors. The weather prediction model transmits the predicted weather state to a user responsible for agricultural management of the query location.

20 Claims, 7 Drawing Sheets

(51) Int. Cl.
*G06F 16/29* (2019.01)
*G06F 16/9537* (2019.01)

(56) References Cited

U.S. PATENT DOCUMENTS

| | | | |
|---|---|---|---|
| 7,702,597 B2 | 4/2010 | Singh et al. | |
| 8,065,124 B2 | 11/2011 | Xu et al. | |
| 8,412,419 B1 | 4/2013 | Seamon et al. | |
| 8,917,336 B2 | 12/2014 | Cote et al. | |
| 9,113,118 B2 | 8/2015 | Silverstein et al. | |
| 9,131,196 B2 | 9/2015 | Lim et al. | |
| 9,131,644 B2 | 9/2015 | Osborne | |
| 9,195,891 B2 | 11/2015 | Scharf et al. | |
| 9,230,177 B2 | 1/2016 | Dolinar et al. | |
| 9,342,858 B2 | 5/2016 | Cote et al. | |
| 2005/0100220 A1 | 5/2005 | Keaton et al. | |
| 2010/0079333 A1 | 4/2010 | Janky et al. | |
| 2011/0276336 A1 | 11/2011 | Sweely | |
| 2013/0066666 A1 | 3/2013 | Anderson et al. | |
| 2013/0124239 A1 | 5/2013 | Rosa et al. | |
| 2013/0321677 A1 | 12/2013 | Cote et al. | |
| 2013/0322753 A1 | 12/2013 | Lim et al. | |
| 2014/0032271 A1 | 1/2014 | Nordstrand | |
| 2014/0067270 A1* | 3/2014 | Gail .................. G01W 1/00 702/3 | |
| 2014/0358486 A1 | 12/2014 | Osborne | |
| 2014/0379228 A1 | 12/2014 | Batcheller et al. | |
| 2015/0015692 A1 | 1/2015 | Smart | |
| 2015/0116330 A1 | 4/2015 | Chiocco et al. | |
| 2015/0206255 A1 | 7/2015 | Groeneveld | |
| 2015/0327440 A1 | 11/2015 | Dybro et al. | |
| 2015/0370935 A1 | 12/2015 | Starr | |
| 2015/0371161 A1 | 12/2015 | Mueller et al. | |
| 2016/0050840 A1 | 2/2016 | Sauder et al. | |
| 2016/0055593 A1 | 2/2016 | Groeneveld | |
| 2016/0063639 A1 | 3/2016 | Groeneveld | |
| 2016/0066505 A1 | 3/2016 | Bakke et al. | |
| 2016/0071223 A1 | 3/2016 | Rupp et al. | |
| 2016/0071410 A1 | 3/2016 | Rupp et al. | |
| 2016/0073573 A1 | 3/2016 | Ethington et al. | |
| 2016/0078304 A1 | 3/2016 | Bremer et al. | |
| 2016/0078570 A1 | 3/2016 | Ethington et al. | |
| 2016/0084813 A1 | 3/2016 | Anderson et al. | |
| 2016/0084987 A1 | 3/2016 | Dybro et al. | |
| 2016/0171680 A1 | 6/2016 | Lobell | |
| 2016/0180473 A1 | 6/2016 | Groeneveld | |
| 2016/0202227 A1 | 7/2016 | Mathur et al. | |
| 2016/0232621 A1 | 8/2016 | Ethington et al. | |
| 2016/0247082 A1 | 8/2016 | Stehling et al. | |
| 2016/0259089 A1* | 9/2016 | McKinnon ............. G06Q 50/02 | |
| 2016/0290918 A1 | 10/2016 | Xu et al. | |
| 2018/0188417 A1 | 7/2018 | Spatzier | |

FOREIGN PATENT DOCUMENTS

| | | |
|---|---|---|
| CN | 104635281 A | 5/2015 |
| CN | 107300703 A | 10/2017 |
| CN | 108375807 A | 8/2018 |
| EP | 2491721 B1 | 6/2016 |
| GB | 2531908 A | 5/2016 |
| WO | WO 2010126783 A2 | 11/2010 |
| WO | WO 2010126783 A3 | 11/2010 |
| WO | WO 2015092800 A1 | 6/2015 |
| WO | WO 2015200489 A1 | 12/2015 |
| WO | WO 2016037105 A1 | 3/2016 |
| WO | WO 2016099723 A2 | 6/2016 |
| WO | WO 2016127094 A1 | 8/2016 |
| WO | WO 2016144818 A1 | 9/2016 |
| WO | WO 2016160384 A1 | 10/2016 |
| WO | WO 2016164147 A1 | 10/2016 |
| WO | WO 2017/104882 A1 | 6/2017 |

OTHER PUBLICATIONS

PCT International Search Report and Written Opinion, PCT Application No. PCT/CA2018/051127, dated Sep. 12, 2018, nine pages.

Stahl, K. et al., "Comparison of approaches for spatial interpolation of daily air temperature in a large region with complex topography and highly variable station density," Agricultural and Forest Meteorology, vol. 139, No. 3-4, 2006, pp. 224-236.

Van Der Voet, P. et al., "Spatial interpolation of daily meteorological data," DLO Winand Staring Centre, vol. 53, No. 3, 1994, 100 pages.

Sluiter, R., "Interpolation Methods for Climate Data", Intern Rapport; IR Apr. 2009, Literature review, KNMI, R&D Information and Observation Technology, De Bilt, Nov. 19, 2008, Version 1.0, 28 pages.

Hofstra, N. et al., "Comparison of Six Methods for the Interpolation of Daily, European Climate Data," American Geophysical Union, Journal of Geophysical Research, vol. 113, D21110, 2008, 19 pages.

Li, J. et al., "A Review of Spatial Interpolation Methods for Environmental Scientists," Australian Government, Record 2008/23, Geocat#68229, 2008, 154 pages.

\* cited by examiner

INDICATOR INTERPOLATION TO PREDICT A WEATHER STATE

CROSS REFERENCE TO RELATED APPLICATIONS

This application claims the benefit of priority to U.S. Provisional Application No. 62/558,643, filed Sep. 14, 2017 which is incorporated herein by reference in its entirety for all purposes.

TECHNICAL FIELD

This description relates to estimation of weather information using field-driven data obtained from multiple remote weather stations.

BACKGROUND

Farmers, producers, and agronomists use farm management systems to support their agronomic management and agricultural planning process. Farm management and agricultural management systems, commonly require a variety of data inputs to perform necessary calculations for the agricultural management cycle. Many of these inputs are categorical variables and properties that support agricultural management life cycles, including and not limited to, soil properties, elevation, seed type, crop variety, nutrient applications, weather, and so on.

Meanwhile, when each categorical variable is examined, there are many additional properties that comprise the categorical variable. With particular interest in the attributes that comprise weather properties, which may include, temperature, humidity, precipitation, wind speed or direction, to provide a few examples. Whenever available, the weather information collected directly from the agriculture field will drive more accuracy in the decision-making process.

One approach to collect weather data directly from the field is to install weather stations at all desired locations. However, by installing hardware at every desired location, this may impose a substantial cost. Therefore, a method to retrieve and leverage data from already existing weather stations would be beneficial. Further, a method that can approximate weather data for locations that do not include a weather station would be beneficial.

SUMMARY

Described is a method for predicting a weather state by interpolating weather information from weather measurement systems located in or near a query location such as an agricultural field. The method is more efficient, less computationally expensive, easier to interpret and more accurate than more traditional weather interpolation methods.

In particular, a weather prediction model accesses a number of indicator weather states from known and nearby weather measurement systems. Each weather measurement system is at a measurement location and configured to determine a weather state at the measurement location. The weather prediction model predicts a weather state for a query location using the weather states determined by the weather measurement systems. Predicting the weather state at the query location may consider the number of weather measurement systems near the query location, their geometrical configuration, and the values that are measured by each such weather measurements system. The values measured by the weather measurement systems are used to predict a weather state at the query location. Using the wearer prediction model reduces the need to have a weather measurement system installed on every desired location in an area.

Predicted weather states at the query location may impact decisions that agronomists, producers, farmers, or farm managers make throughout the year. For example, this the weather prediction model may be applied to historical data that has already been collected, determine a weather forecast, and a farmer may choose a farming process based on the forecast.

The figures depict various embodiment for purposes of illustration only. One skilled in the art will readily recognize from the following discussion that alternative embodiments of the structures and methods illustrated herein may be employed without departing from the principles described herein.

DETAILED DESCRIPTION

I. Introduction

This method seeks to predict a weather state at a query location, or locations, in an area by interpolating results obtained from one or more weather measurements systems in the area. An area is some amount of geographic area that may include weather measurement systems and agricultural fields. Herein, a weather state is a quantification or measurement of some aspect of the weather such as, for example, precipitation, humidity, temperature, pressure, wind speed, etc. Thus, a predicted weather state is a predicted value of a weather state at a particular location in the area. Location and area centric weather information (e.g., weather states) is obtained from weather measurement systems or other sources of data to drive better and more efficient interpolated results for any missing locations within the area.

II. System Environment

Figure 1:
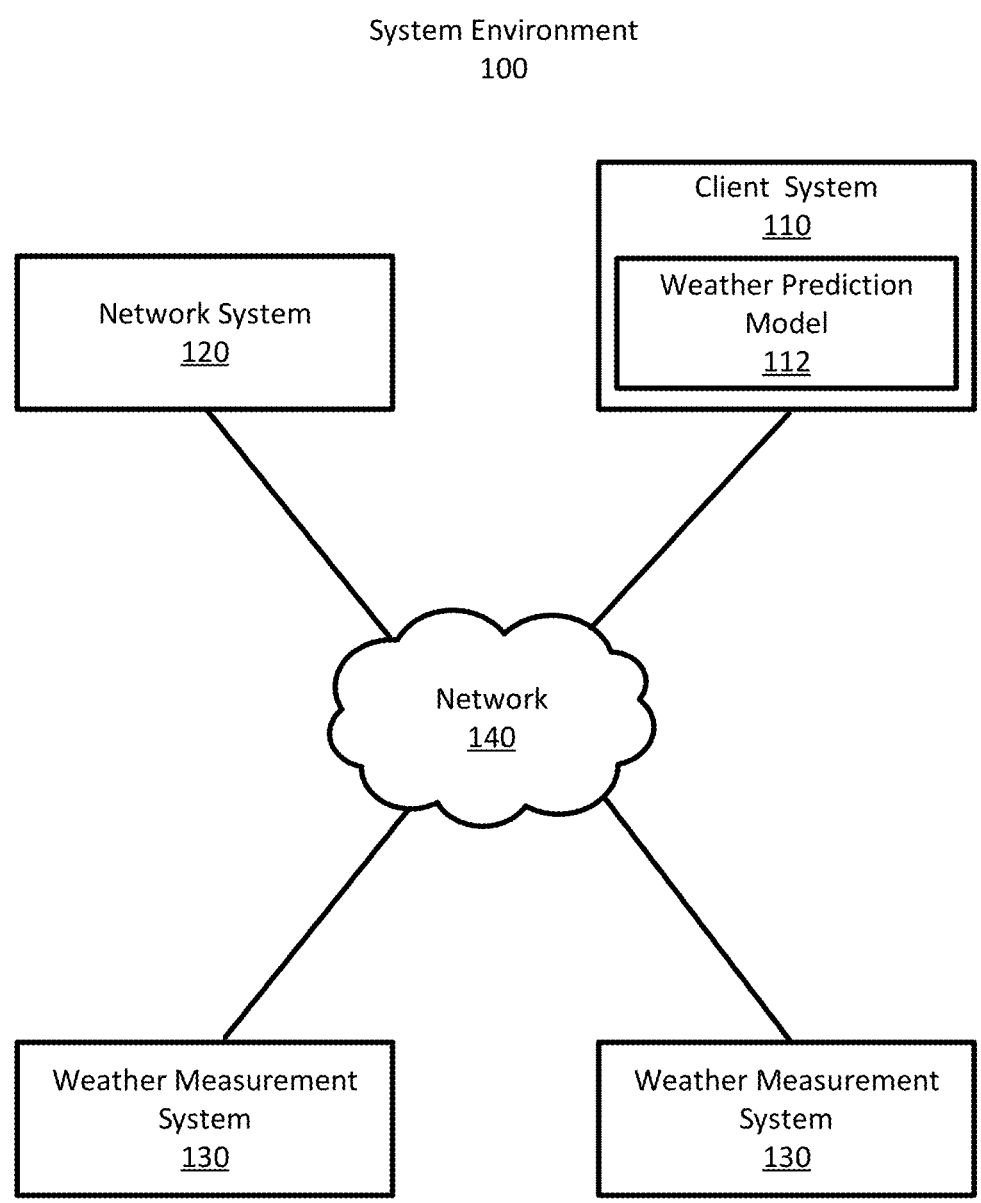
FIG. 1 is an illustration of a system environment for predicting a weather state at a location using a weather prediction model, according to one example embodiment.

FIG. 1 illustrates a system environment 100 for predicting a weather state at a query location within an area. Within the system environment 100, a client system 110 predicts a weather state at a query location using a weather prediction model 112. A network system 120 accesses current and historical weather states ("indicator weather states" in aggregate) from a weather measurement system 130 via a network 140. When predicting a weather state, a client system 110 may request indicator weather states via the network 140 and the network system 120 may provide the indicator weather states in response.

A client system 110 is any system capable of executing a weather prediction model 112 to predict a weather state at a query location $l_q$. The client system 110 may be a computing device, such as, for example, a personal computer. Network system 120 may also be a computing device, such as, for example, a set of servers that can operate with or as part of another system that implements network services for facilitating determining predicted weather states. Network system 120 and client system 110 comprise any number of hardware components and/or computational logic for providing the specified functionality. That is, the systems herein can be implemented in hardware, firmware, and/or software (e.g., a hardware server comprising computational logic), other embodiments can include additional functionality, can distribute functionality between systems, can attribute functionality to more or fewer systems, can be implemented as a standalone program or as part of a network of programs, and can be loaded into memory executable by processors.

In one example, a client system 110 is operated by a user responsible for managing crop production in an agricultural field within the area, but could be operated by any other user. The user of the client system 110 inputs a query location $l_q$ into the weather prediction model 112 and the weather prediction model 112 predicts a weather state for that query location $l_q$ in response. Generally, the query location $l_q$ is the location of the agricultural field, or a portion of the agricultural field, managed by the user, but could be any other query location $l_q$. In some instances, the query location $l_q$ may be the location of the client system 110.

A client system 110 is connected to a network system 120 via a network 140. The network system 120 facilitates the weather prediction model 112 accurately predicting a weather state at the query location $l_q$. In various examples, the network system 120 may access indicator weather states from weather measurement systems 130 in the area. The network system 120 can provide the indicator weather states to the client system 110 such that the weather prediction model 112 can predict a weather state at the query location $l_q$. In some examples, the network system 120 (or the client system 110) may store any of the indicator weather states in a datastore. Stored indicator weather states may be accessed by weather prediction model 112 to predict a weather state at a query location $l_q$. In some examples, the weather prediction model 112 is executed on a network system 120 and a client system 110 accesses the weather prediction model via the network 140.

A weather measurement system 130 is any system or device that can provide indicator weather states to the network system 120 and client system 110. In some instances, a weather measurement system 130 is a system or device capable of measuring and/or quantifying an aspect of the current weather (i.e., current weather states). For example, a weather measurement system 130 may be a weather station operated the National Weather Service, but could be any other weather measurement system 130. In other instances, a weather measurement system 130 may be an external system that stores previously measured weather states (i.e., historical weather states). For example, the weather measurement system 130 may be a database that stores historical records of weather in the area as indicator weather states. In either example, a weather measurement system may provide indicator weather states to network system 120 or client system 110. Notably, while system environment 100 illustrates two weather measurement systems 130, the system environment 100 can include any number of weather measurement systems 130.

The network 140 represents the communication pathways between systems in the environment 100. In one embodiment, the network is the Internet, but can also be any network, including but not limited to a LAN, a MAN, a WAN, a mobile, wired or wireless network, a cloud computing network, a private network, or a virtual private network, and any combination thereof. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Within the system environment 100, each indicator weather state is associated with a measurement location $l_m$. Each measurement location $l_m$ is a distance $d_m$ away from the query location $l_q$. Generally, the measurement location $l_m$ of an indicator weather state is the location at which a weather measurement system 130 determined the indicator weather state. The distance $d_m$ between the query location $l_q$ and the measurement location $l_m$ can be determined by the weather prediction model 112 when predicting a weather state.

III. Predicting a Weather State

The client system 110 uses a weather prediction model 112 to predict a weather state for a query location $l_q$. The weather prediction model 112 receives a query location $l_q$ as input and provides a predicted weather state at the query location $l_q$ as output. When predicting a weather state, the weather prediction model 112 may request and receive indicator weather states from network system 120 to facilitate predicting the weather state. Network system 120 may access the indicator weather states from a storage database of the network system 120 or from weather measurement systems 130 as previously described.

Figure 2:
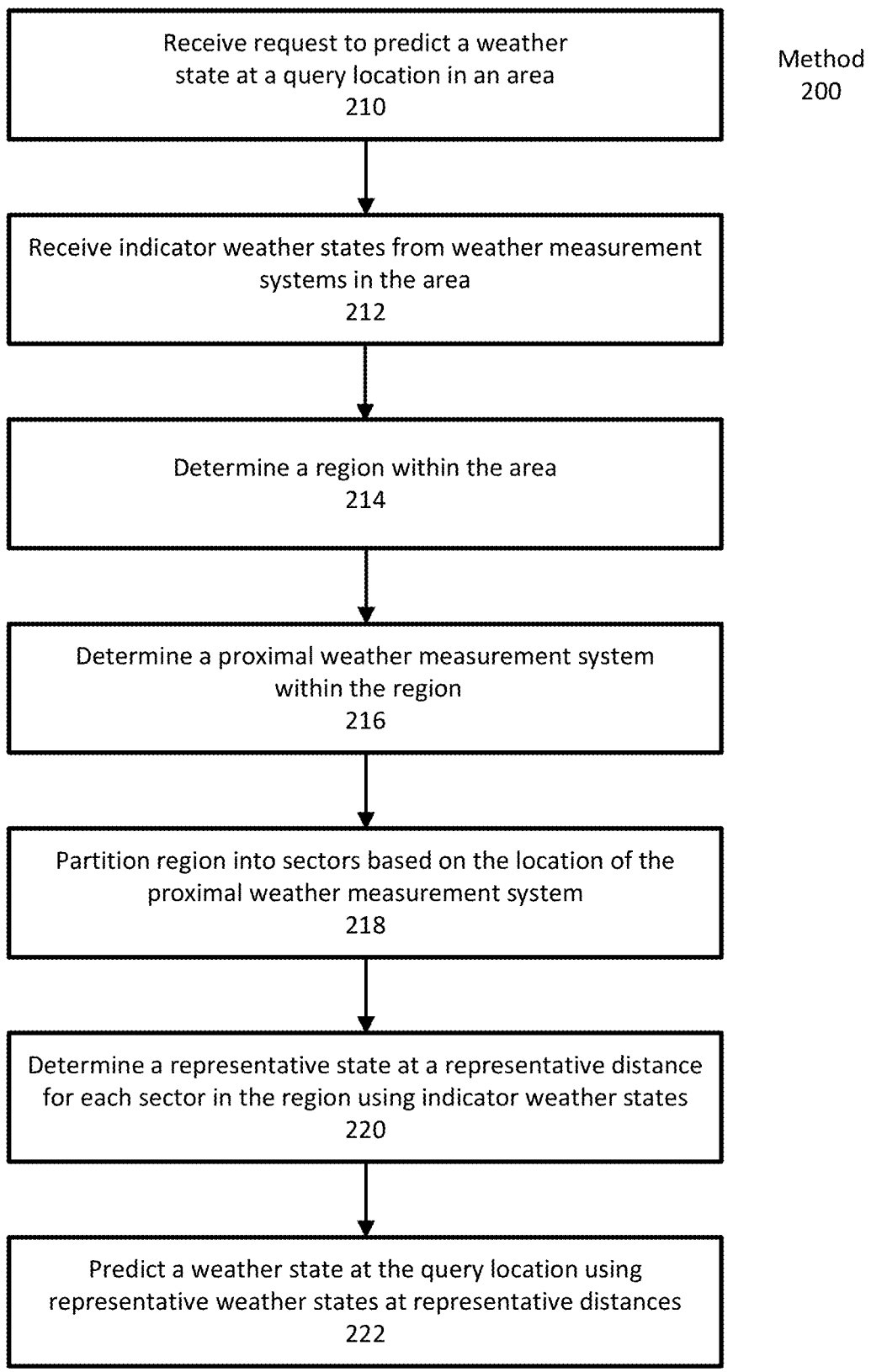
FIG. 2 is a flow diagram illustrating an example method for predicting a weather state at a query location, according to one example embodiment.

FIG. 2 illustrates a method 200 to predict a weather state. The method 200 may be executed by a weather prediction model 112 executing on client system 110. The method 200 will be described in reference to FIGS. 3-7. In various embodiments, the method 200 can include additional or fewer steps and the steps may occur in any order.

Figure 3:
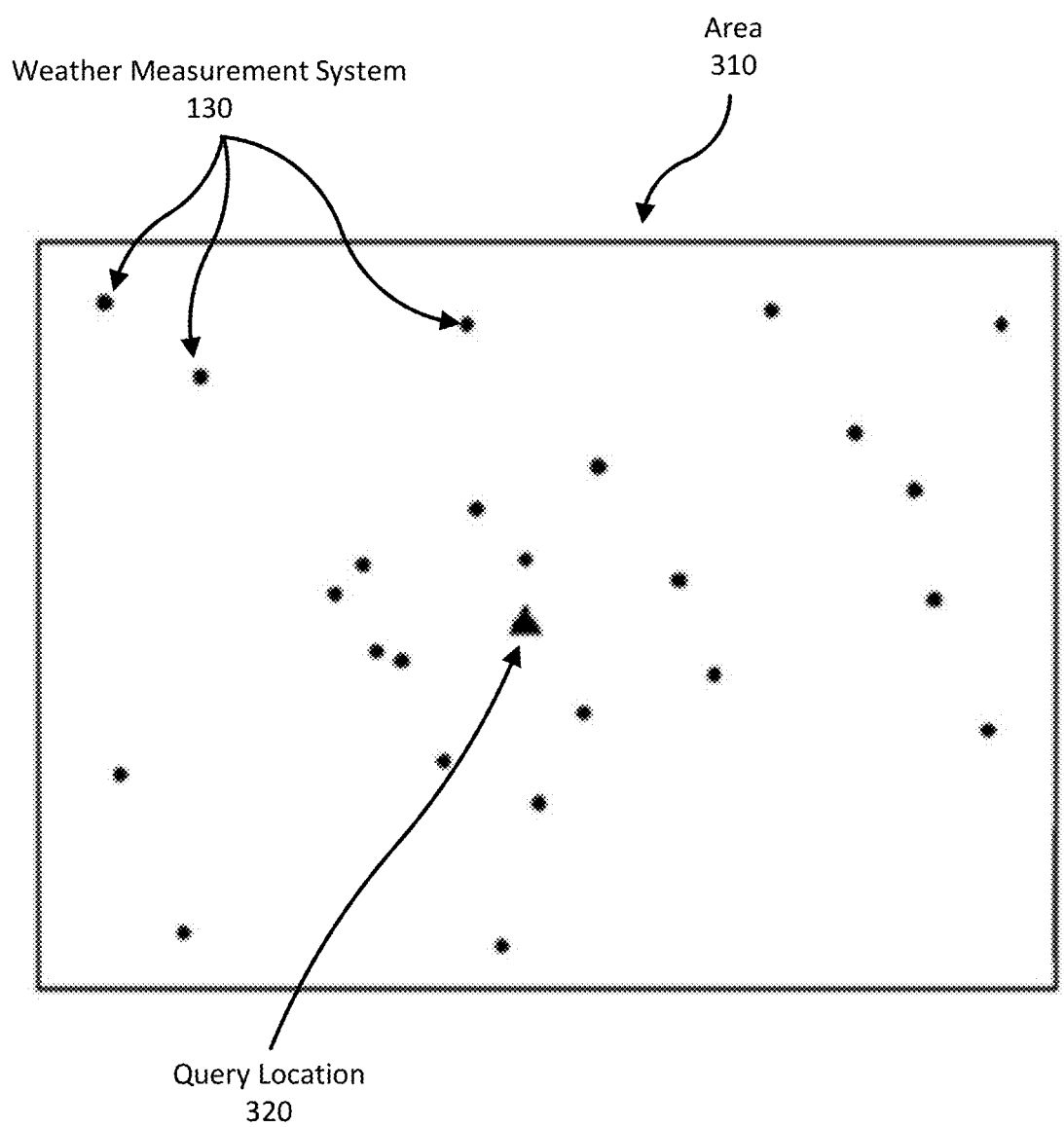
FIG. 3 is an illustration of an area including a query location and a number of weather measurement systems, according to one example embodiment.

To begin, a weather prediction model 112 receives 210 a request to predict a weather state at a query location $l_q$ in an area. In this example, an operator of the client system 110 inputs the query into the weather prediction model 112 and initializes the request. Here, the query location $l_q$ is an agricultural field in an area and the operator is a person responsible for managing crop production of the agricultural field. The area also includes a number of weather measurement systems 130 that can provide indicator weather states for the weather prediction model 112. To demonstrate, FIG. 3 is an illustration of an area 310. The area 310 is shown as a rectangle with a black boundary. Within the area 310 is a query location $l_q$ 320 and weather measurement systems 130. The query location $l_q$ 320 is illustrated as a triangle and the weather measurement systems 130 are illustrated as dots.

Returning to FIG. 2, the weather prediction model 112 receives 212 a set of indicator weather states from weather measurement systems 130 in the area 310. In some examples, the weather prediction model 112 receives the indicator weather states in response to the client system 110 requesting the indicator weather states from network system 120. In other examples, the indicator weather states are stored on a database of client system 110 and the weather prediction model 112 receives (or accesses) the predictive states from the database. The measurement location $l_m$ for each indicator weather state is the location of the weather measurement system 130 in the area 310 that measured the indicator weather state. Thus, referring to FIG. 3, each of the weather measurement systems 130 is a measurement location $l_m$ for an indicator weather state used by the weather prediction model 112. The weather prediction model 112 may determine a measurement distance $d_m$ indicating the distance between the query location $l_q$ and the measurement location $l_m$. That is $d_m = |l_q - l_m|$.

Returning to FIG. 2, the weather prediction model 112 determines 214 a region within the area. The region is a geographical extent within the area 310 that is within a proximity distance $d_p$ from the query location $l_q$. For context, a proximity distance $d_p$ for a region may be approximately 100 km. As such, a region may be approximately thirty thousand square kilometers while an area is over a hundred thousand square kilometers, but an area and a region may be any other size. The weather prediction model 112 only uses indicator weather states from measurement locations $l_m$ within the region to predict a weather state. The proximity distance $d_p$ may be predetermined (e.g., 75 km), selected by an operator of a client system 110 (e.g., as a user input), or dynamically determined based on a variety of criteria. Some of the criteria for determining a proximity distance $d_p$ may include the density of weather measurement systems 130 surrounding the query location $l_q$ 320, a threshold number of weather measurement systems 130 to include in a region, the reliability of weather measurement systems 130, etc. Take, for example, a query location $l_q$ 320 surrounded by weather measurement systems 130 at a density of 3 weather measurement systems 130 per 50 square km. In this case, weather prediction model 112 determines a proximity distance $d_p$ of 100 km. In another example, a query location $l_q$ 320 is surrounded by weather measurements systems 130 with a density of 10 weather measurement systems 130 per 50 square km. In this case, the weather prediction model 112 selects a proximity distance $d_p$ of 60 km because of the increased density of weather measurement systems 130.

Figure 4:
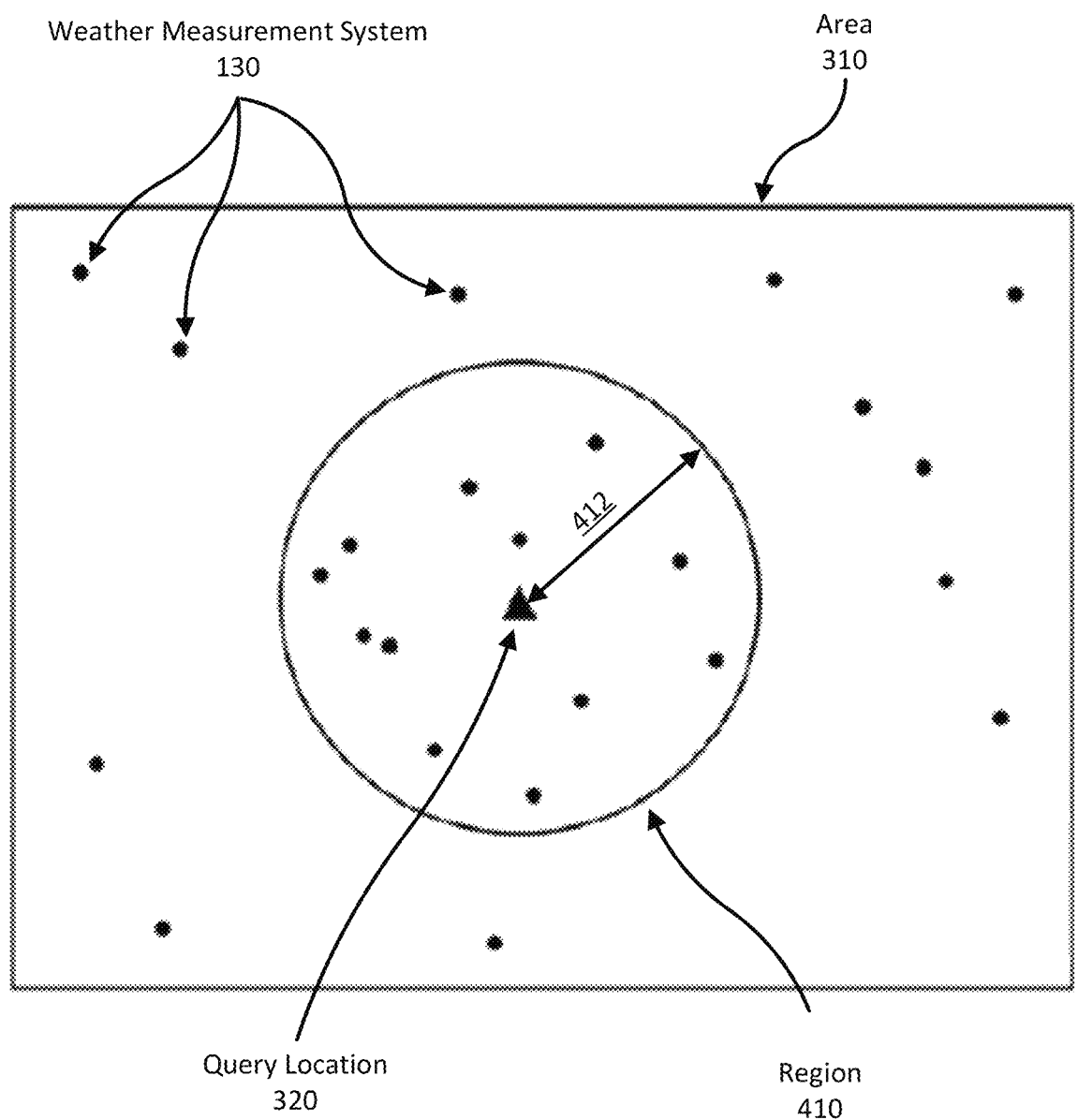
FIG. 4 is an illustration of weather measurement systems in a region within a proximity distance from the query location, according to one example embodiment.

To demonstrate, FIG. 4 illustrates a region 410 determined by a weather prediction model 112 within an area 310. Here, the region 410 is illustrated as a grey circle bounded by a black ring and includes all the area within a proximity distance $d_p$ 412 from the query location $l_q$ 320. The proximity distance $d_p$ 412 is indicated as a line. The region 410 is approximately circular with the query location $l_q$ 320 at the center of the circle. In this example, the proximity distance $d_p$ 412 is predetermined. Also within the region 410 are weather measurement systems 130 that are nearer the query location $l_q$ 320 than the proximity distance $d_p$ 412. That is, $d_m < d_p$ for all of the weather measurement systems 130 within the region 410. The weather prediction model 112 only uses indicator weather states from weather measurement systems 140 within the region 410 to predict a weather state.

In some examples, the method 200 may determine a region 410 before receiving weather indicator states. In this case, only indicator weather states from weather measurement systems 130 within the region 410 are provided to the weather prediction model 112.

Figure 5:
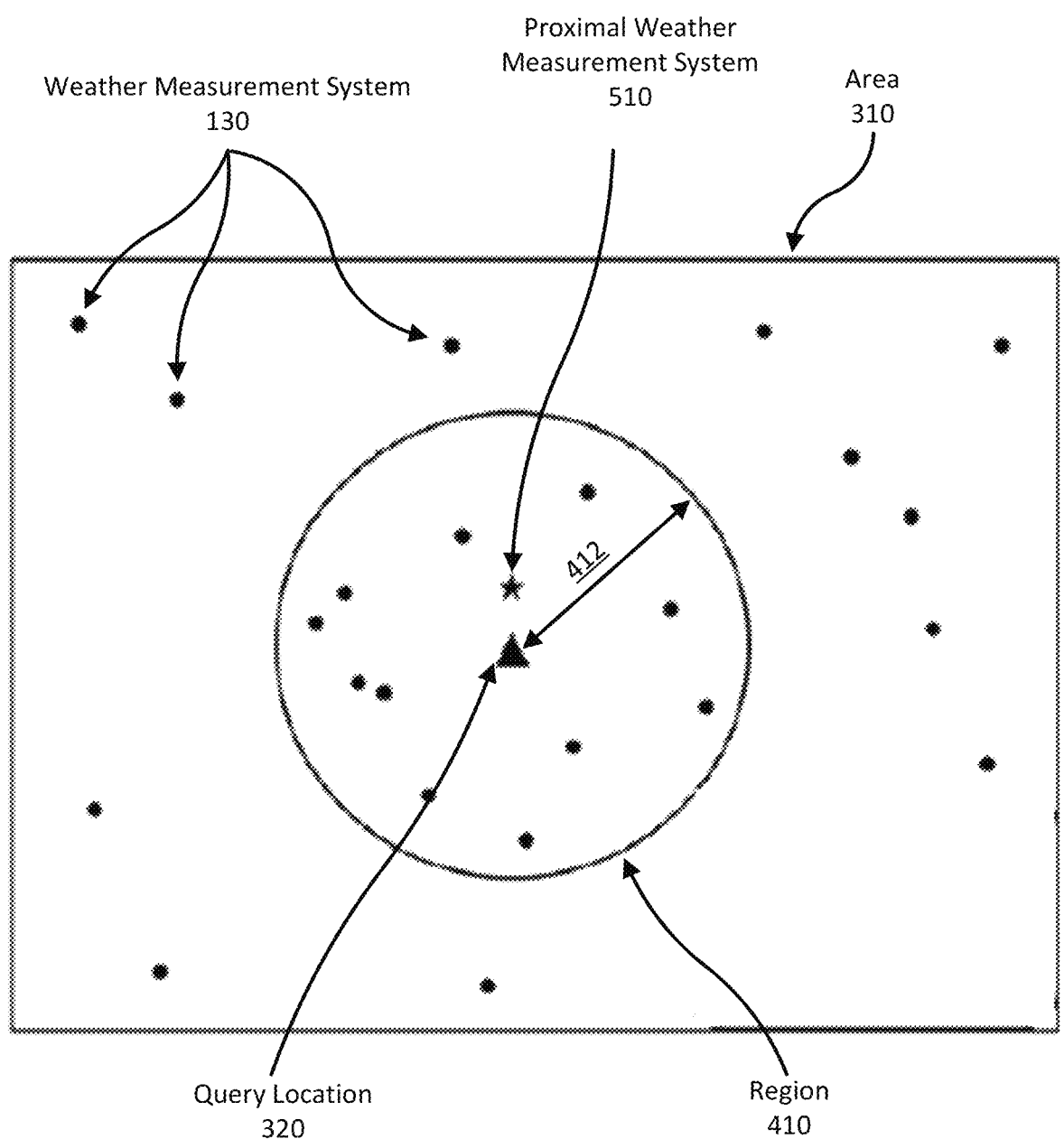
FIG. 5 is an illustration of a proximal weather measurement system within the prediction area, according to one example embodiment.

Returning to FIG. 2, the weather prediction model 112 determines 216 a proximal weather measurement system 130 within a region 410 and, thereby, determines a proximal indicator weather state. A proximal indicator weather state is the most important indicator weather state for accurately predicting a weather state. A proximal weather measurement system is the weather measurement system 130 whose measurement location $l_m$ is nearest the query location $l_q$ 320. That is, the proximal weather measurement system is the weather measurement system 130 in the region 410 with the smallest measurement distance $d_m$. To demonstrate, FIG. 5 illustrates a proximal weather measurement system 510 determined by the weather prediction model 112. The proximal weather measurement system 130 is the weather measurement system 130 nearest the query location 320 in the region 410. The proximal weather measurement system 510 is illustrated as a star, however, the proximal weather measurement system was previously illustrated as a dot in FIG. 3 and FIG. 4.

Returning to FIG. 2, the weather prediction model 112 partitions 218 a region 410 into a number of sectors. Generally, each sector has approximately the same amount of area, but could have different areas. In one example, each sectors are sectors of a circle, but could form any other shape (e.g., boxes forming a rectangle, triangles forming a triangle, etc.). In some configurations, such as, for example, when the sectors are sectors of a circle, the border between each pair of sectors is a line passing from the query location $l_q$ 320 to a point the proximity distance $d_p$ 412 away.

Weather prediction model 112 may determine the position of sectors within a region 410 based on the location of the proximal weather measurement system 510. In one example, a first sector of the determined sectors is positioned within the region such that a line from the proximal weather measurement system 510 to the query location $l_q$ 320 approximately bisects the first sector. The remaining sectors are equally spaced about the region 410 based on the location of the first sector. For example, if the region 410 is a circle, the weather prediction model 112 may partition the region 410 into six equally sized sectors. Each of the six sectors have an arc of approximately 60 degrees. In this example, the first sector is placed within the region 410 such that a line between the proximal weather measurement system 510 and the query location $l_q$ approximately bisects a sector such that 30 degrees of the sectors arc is on each side of the line. The remaining sectors are placed around the first sector to complete the circle.

Figure 6:
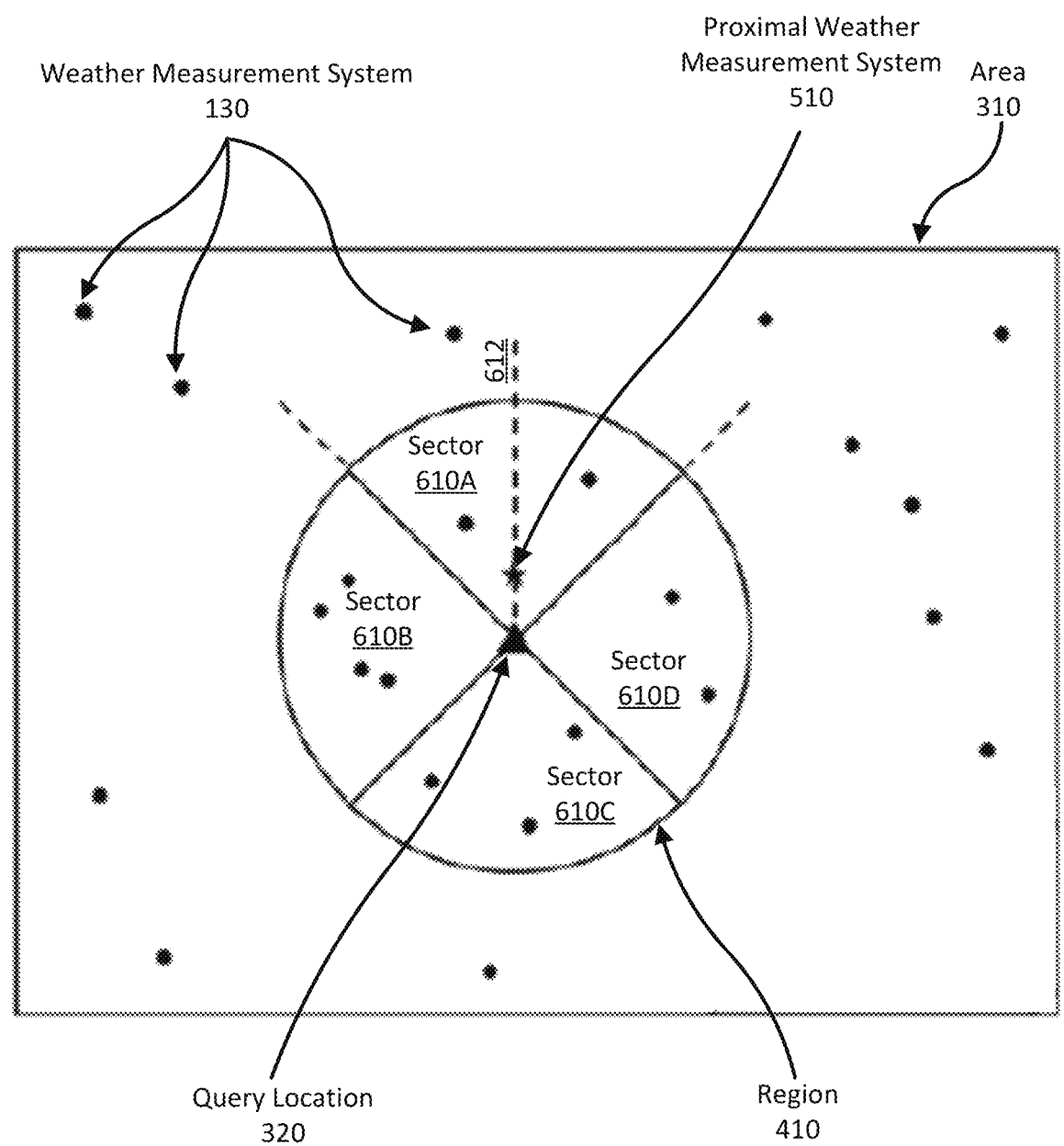
FIG. 6 is an illustration of the region partitioned into four sectors, according to one example embodiment.

To demonstrate, FIG. 6 illustrates a region 410 that has been partitioned into four sectors 610A-610D by the weather prediction model 112. In this example, the region 410 is approximately circular and surrounds the query location $l_q$ 320 such that the radius of the region 410 is approximately the proximity distance $d_p$ 412. A line 612 that connects the proximal weather measurement system 510 to the query 320 location is illustrated. Because the region 410 is partitioned into four sectors 610, each sector 610 spans a 90° arc of the circular region 410. A first sector 610A of the sectors 610 is positioned within the region 410 such that the illustrated line 612 approximately bisects the sector 610A. That is, the first sector 610A is positioned such that 45° of the 90° arc of the first sector 610A is on each side of the illustrated line 612. The remaining sectors 610B-D are positioned such that they complete the circular region 410 with the query location $l_q$ 320 at the center.

Returning to FIG. 2, the weather prediction model determines 220 a representative weather state at a representative location $l_r$ for each of the sectors 610. The representative weather state is a weather state that represents the weather in the sector 610. In one example, the representative weather state for a sector 610 is an average of the indicator weather states for each weather measurement system 130 located in the sector 610. In another example, the representative weather state for a sector 610 uses an inverse distance weighting method. That is, indicator weather states that have measurement locations $l_m$ closer to the query location $l_q$ are assigned larger weights compared to indicator weather states whose measurement locations $l_m$ are farther away. In other examples, some other function may be used to determine a representative weather state for a sector 610. In some examples, weather prediction model 112 may only use a pre-determined number of indicator weather states from weather measurement systems 510 located within a sector 610. For example, if a sector 610 includes indicator weather states from 20 weather measurement systems 130, weather prediction model 112 may only use 10 of the indicator weather states. Further, in some examples, weather prediction model 112 may only use the indicator states from the weather measurement systems 130 in the sector 610 that are closest to the query location $l_q$ 320.

The representative location $l_r$ for a sector is separated from the query location $l_q$ by a representative distance $d_r$. That is, $d_r = |l_q - l_r|$. In one example, the representative location $l_r$ for each sectors 610 is located within the sector 610 such that a line connecting the representative location $l_r$ and the query location $l_q$ approximately bisects the sector 610. In other examples, the line may not bisect the sector.

In some cases, the weather determination model 112 can determine the representative distance $d_r$ based on the sector 610. In one example, in the sector 610 including a proximal weather measurement system 510, the weather prediction model 112 determines the representative distance $d_r$ for that sector 610 is the distance between the measurement location $l_m$ of the proximal weather measurement system 510 and the query location $l_q$ 320. Thus, the representative location $l_r$ is the measurement location $l_m$ of the proximal weather measurement system 510. In the other sectors, the weather prediction model 112 determines a representative distance $d_r$ that is a harmonic average of the distances between the query location and the measurement locations $l_q$ of the weather measurement systems 130 in that sector. Thus, in this case, the representative distance $d_r$ may not coincide with a measurement location $l_m$ of a weather measurement system 130. In other examples, the weather prediction model 112 can determine a representative distance $d_r$ using any other technique to average distances.

Figure 7:
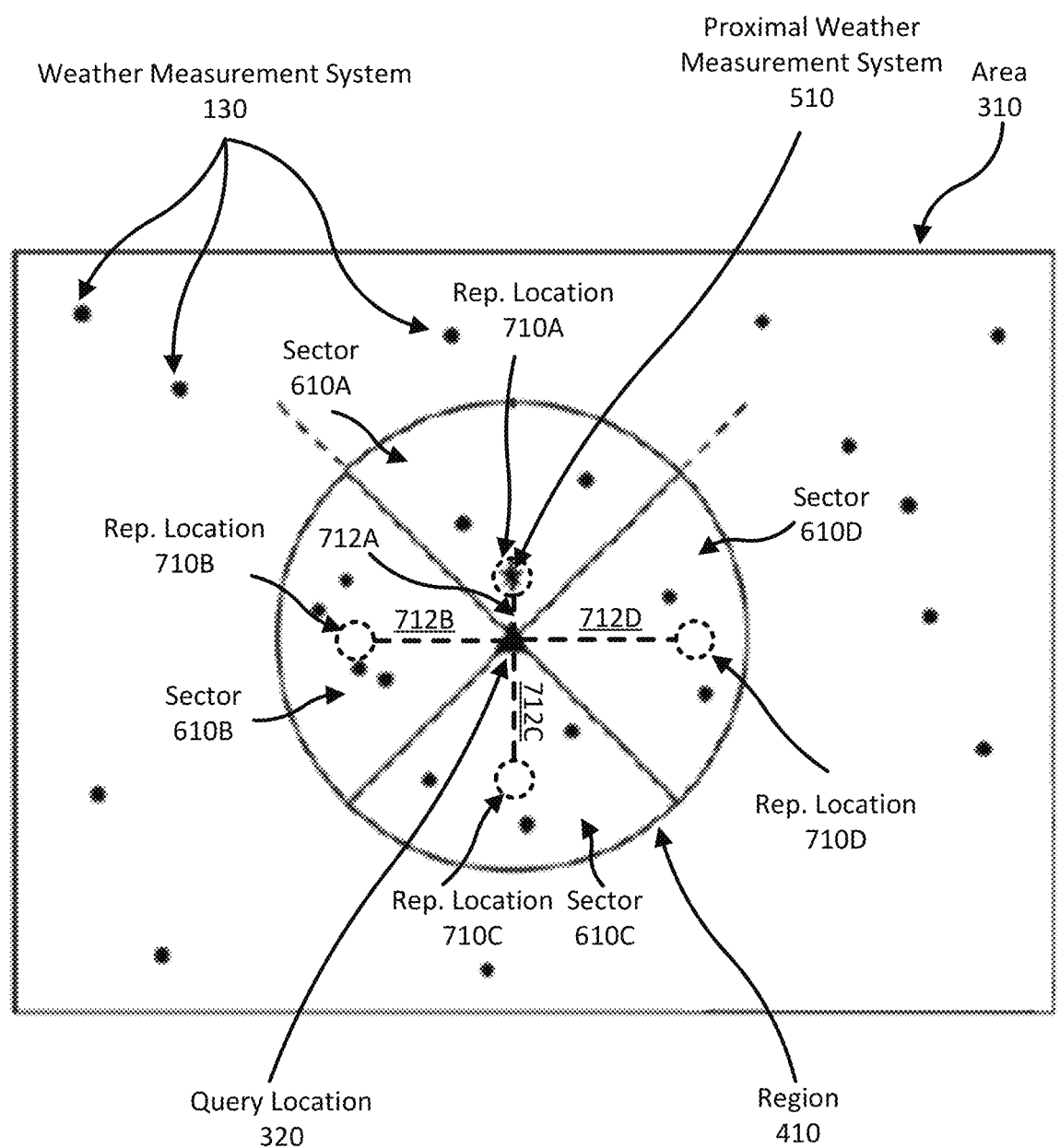
FIG. 7 is an illustration of representative locations at representative distances for each sector of a region used to predict a weather state at the query location, according to one example embodiment.

To demonstrate, FIG. 7 illustrates a region 410 with determined representative locations 710 at representative distances 712. Each representative location 710 is illustrated as a dashed circle and each representative distance 712 is illustrated as a dashed line. In the sector 610A including the proximal weather measurement system 510, the representative location 710A is at the measurement location $l_m$ of the proximal weather measurement system 510. In the other sectors 610B-D, the representative locations 710B-D are at a representative distance $d_r$ 712B-D on a line bisecting its respective sector 610B-D. The representative distances $d_r$ 712B-D for a sector 610B-D is the harmonic mean of the distances between the query location $l_q$ and the measurement locations $l_m$ of the weather measurement systems 130 in that sector 610B-D.

Returning to FIG. 2, the weather prediction model predicts 222 a weather state for the query location $l_q$ using the representative weather state, representative locations $l_r$ 710, and representative distances $d_r$ 712 for each sector 610. In one example, the weather prediction model 112 performs a linear interpolation of representative weather states between representative locations $l_r$ 710 at representative distances $d_r$ 712 within sectors 610 on opposite sides of the query location $l_q$ 520 to determine the predicted weather state. The predicted weather state at the query location $l_q$ is some function of the interpolated pairs such as, for example, mean, median, etc. In other examples, another function may be used to predict a weather state.

The predicted weather state is any weather state that can be predicted by indicator weather states. For example, if all of the weather measurement systems 130 have an indicator weather state indicating a current amount of rain fall, the weather prediction model generates a representative weather state at a representative location $l_r$ 710 indicating rain fall for each sector 610. The weather prediction model 112 interpolates the representative weather states at the representative distances $d_r$ 712 of the representative locations $l_r$ 710 to predict an amount of rainfall at the query location $l_q$ 520. Of course, this is just an example of predicting a weather state. Weather prediction model 112 can use any indicator weather states described herein to predict a state.

Weather prediction model 112 outputs the predicted weather state to the operator of the client system 110. The operator of the client system 110 may use the predicted weather state to apply real-time decision making for the current agricultural life cycle in the agricultural field. The predicted weather state may be stored on a database of client system 110 or network system 120.

IV. Additional Model Outputs

In some examples, predicted weather states can be combined with other predicted weather states to generate a predicted weather map of the area. The predicted weather map can include any number of zones such that the predicted weather map represents a zone-by-zone map (or table) displaying current, historical, and/or predicted weather states in the area. The weather map includes no empty zones because of the predicted weather states.

Additionally, in some examples, current, historical, and/or predicted weather states may be combined about a sector 610 or zone in an area 310 to provide a holistic view of the sector 610 or zone. For example, if the weather states in the sector indicate current rain fall, high humidity, and a large amount of historical rain fall, the holistic view may include "flood risk." In another example, if the weather states in a zone indicate no rain fall, high temperatures, a low amount of historical rain fall, the holistic view may include "drought."

The predicted weather states may be analyzed to predict a future trend. For example, weather prediction model 112 can use predicted weather states from a previous growing season, or seasons, to predict a weather state for the current season.

In another example, a predicted weather state may be used by a machine in a field to take an action. For example, a predicted weather state indicating drought may be sent to a boom sprayer in a field and the boom sprayer may increase the amount of water provided to plants in response. Other examples of a farming machine utilizing a predicted weather state are also possible.

V. Additional Configuration Considerations

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A method of predicting a weather state at a query location in a region, the method comprising:
   determining a measurement location of a plurality of weather measurement systems in the region, each measurement location being a distance away from the query location;
   for each of the plurality of weather measurement systems, accessing an indicator weather state representing the state of the weather at the measurement location for that weather measurement system;
   determining a number of sectors in the region, each sector including a subset of one or more of the plurality of weather measurement systems within the sector, in which at least one of the sectors includes more than one of the plurality of the weather measurement systems within that sector;
   for each sector,
      determining a representative weather state for the sector using the accessed indicator weather states of the weather measurement systems whose measurement location is located within the sector in which the representative weather state for said at least one of the sectors that includes more than one of the weather measurement systems therein is representative of the indicator weather states of said more than one of the weather measurement systems, and
      determining a representative distance for the sector using the distance between the measurement location and query location for each weather measurement system located within the sector in which the representative distance for said at least one of the sectors that includes more than one of the weather measurement systems therein is representative of the distances of said more than one of the weather measurement systems;
   predicting a weather state for the query location using the representative weather states and representative distances of the sectors; and
   transmitting the predicted weather state at the query location to a client system.

2. The method of claim 1, further comprising:
   receiving a request to predict a weather state for a query location from the client system.

3. The method of claim 1, wherein the measurement locations of the plurality of weather measurement systems are located within a proximity distance of the query location.

4. The method of claim 3, wherein the proximity distance is determined based on the density of weather measurement systems in the region.

5. The method of claim 1, further comprising:
   determining a proximal measurement system of the plurality of weather measurement systems, the proximal weather measurement system having the measurement location closest to the query location.

6. The method of claim 5, wherein said determining a number of sectors further comprises:
   partitioning the region into a number of sectors where the position of each sector within the region is based on the location of the proximal weather measurement system.

7. The method of claim 6, wherein the number of sectors approximate a circle and partitioning the region into a number of sectors further comprises:
   positioning a first sector of the number of sectors in the region such that a first sector is approximately bisected by a line connecting the query location to the measurement location of the proximal weather measurement system.

8. The method of claim 1, wherein predicting a weather state for the query location using the representative weather states and representative distances of the sectors further comprises:
   interpolating the representative weather states from sectors on opposing sides of the query location.

9. The method of claim 1, further comprising:
   determining a holistic representation for the query location, representative location, sector, or area based on the representative weather states and predicted weather states.

10. The method of claim 1, further comprising:
    storing the predicted weather state on a database of the client system as an indicator weather state.

11. A system comprising one or more processors and one or more memories storing computer program instructions for predicting a weather state at a query location in a region, the instructions when executed by the one or more processors to perform the steps including:
    determining a measurement location of a plurality of weather measurement systems in the region, each measurement location being a distance away from the query location;
    for each of the plurality of weather measurement systems, accessing an indicator weather state representing the state of the weather at the measurement location for that weather measurement system;
    determining a number of sectors in the region, each sector including a subset one or more of the plurality of weather measurement systems within the sector, in which at least one of the sectors includes more than one of the plurality of the weather measurement systems within that sector;
    for each sector,
       determining a representative weather state for the sector using the accessed indicator weather states of the weather measurement systems whose measurement location is located within the sector in which the representative weather state for said at least one of the sectors that includes more than one of the weather measurement systems therein is representative of the indicator weather states of said more than one of the weather measurement systems, and determining a representative distance for the sector using the distance between the measurement location and query location for each weather measurement system located within the sector in which the representative distance for said at least one of the sectors that includes more than one of the weather measurement systems therein is representative of the distances of said more than one of the weather measurement systems;

predicting a weather state for the query location using the representative weather states and representative distances of the sectors;

transmitting the predicted weather state at the query location to a client system.

12. The system of claim 11, wherein the instructions, when executed by the one or more processors, further perform steps including:

receiving a request to predict a weather state for a query location from the client system.

13. The system of claim 11, wherein the measurement locations of the plurality of weather measurement systems are located within a proximity distance of the query location.

14. The system of claim 11, wherein the proximity distance is determined based on the density of weather measurement systems in the region.

15. The system of claim 11, wherein the instructions, when executed by the one or more processors, further perform steps including:

determining a proximal measurement system of the plurality of weather measurement systems, the proximal weather measurement system having the measurement location closest to the query location.

16. The system of claim 15, wherein the instructions for determining a number of sectors, when executed by the one or more processors, further perform steps including:

partitioning the region into a number of sectors where the position of each sector within the region is based on the location of the proximal weather measurement system.

17. The system of claim 16, wherein the number of sectors approximate a circle and wherein the instructions for partitioning the region into a number of sectors, when executed by the one or more processors, further perform steps including:

positioning a first sector of the number of sectors in the region such that a first sector is approximately bisected by a line connecting the query location to the measurement location of the proximal weather measurement system.

18. The system of claim 11, wherein the instructions for predicting a weather state for the query location using the representative weather states and representative distances of the sectors, when executed by the one or more processor, further perform steps including:

interpolating the representative weather states from sectors on opposing sides of the query location.

19. The system of claim 11, wherein the instructions, when executed by the one or more processors, further perform steps including:

determining a holistic representation for the query location, representative location, sector, or area based on the representative weather states and predicted weather states.

20. A non-transitory computer readable storage medium product for predicting a weather state at a query location in an area comprising computer instructions that when executed by a processor cause the processor to:

determine a measurement location of a plurality of weather measurement systems in the region, each measurement location being a distance away from the query location;

for each of the plurality of weather measurement systems, access an indicator weather state representing the state of the weather at the measurement location for that weather measurement system;

determine a number of sectors in the region, each sector including a subset of one or more of the plurality of weather measurement systems within the sector, in which at least one of the sectors includes more than one of the plurality of the weather measurement systems within that sector;

for each sector, determine a representative weather state for the sector using the accessed indicator weather states of the weather measurement systems whose measurement location is located within the sector in which the representative weather state for said at least one of the sectors that includes more than one of the weather measurement systems therein is representative of the indicator weather states of said more than one of the weather measurement systems, and determine a representative distance for the sector using the distance between the measurement location and query location for each weather measurement system located within the sector in which the representative distance for said at least one of the sectors that includes more than one of the weather measurement systems therein is representative of the distances of said more than one of the weather measurement systems;

predict a weather state for the query location using the representative weather states and representative distances of the sectors; and transmit the predicted weather state at the query location to a client system.

* * * * *